US012609551B2

(12) United States Patent　　　　(10) Patent No.:　US 12,609,551 B2

Xin　　　　　　　　　　　　　　　　(45) Date of Patent:　Apr. 21, 2026

(54) METHOD OF CHARGING PROCESSING, ELECTRONIC DEVICE AND STORAGE MEDIUM

(71) Applicant: BEIJING XIAOMI MOBILE SOFTWARE CO., LTD., Beijing (CN)

(72) Inventor: Chengzhou Xin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 706 days.

(21) Appl. No.: 17/991,682

(22) Filed: Nov. 21, 2022

(65) Prior Publication Data

US 2024/0055884 A1　　Feb. 15, 2024

(30) Foreign Application Priority Data

Aug. 11, 2022　(CN) .......................... 202210963164.9

(51) Int. Cl.
*H02J 7/00*　　　　(2026.01)
*H02J 7/61*　　　　(2026.01)
*H02J 7/96*　　　　(2026.01)

(52) U.S. Cl.
CPC ................ *H02J 7/963* (2026.01); *H02J 7/61* (2026.01)

(58) Field of Classification Search
USPC ......................................................... 320/148
See application file for complete search history.

(56) References Cited

U.S. PATENT DOCUMENTS

| | | | |
|---|---|---|---|
| 9,184,607 B2 * | 11/2015 | Su ....................... | H02J 7/00302 |
| 2017/0271903 A1 | 9/2017 | Tian et al. | |
| 2020/0106284 A1 | 4/2020 | Zhang et al. | |
| 2020/0266648 A1 | 8/2020 | Ha et al. | |

OTHER PUBLICATIONS

European Patent Application No. 22210232.9, Search and Opinion dated Sep. 11, 2023, 9 pages.

* cited by examiner

*Primary Examiner* — Samuel Berhanu

(74) *Attorney, Agent, or Firm* — Cozen O'Connor

(57) ABSTRACT

A method of charging processing includes: acquiring a present battery voltage of a terminal battery in response to charging the terminal battery; determining a predetermined charging cut-off voltage of the terminal battery during a present charging; determining whether the terminal battery is in an overcharging state according to the predetermined charging cut-off voltage and the present battery voltage; and in response to determining that the terminal battery is in the overcharging state, adjusting the predetermined charging cut-off voltage, and controlling the present charging of the terminal battery based on an adjusted charging cut-off voltage.

16 Claims, 4 Drawing Sheets

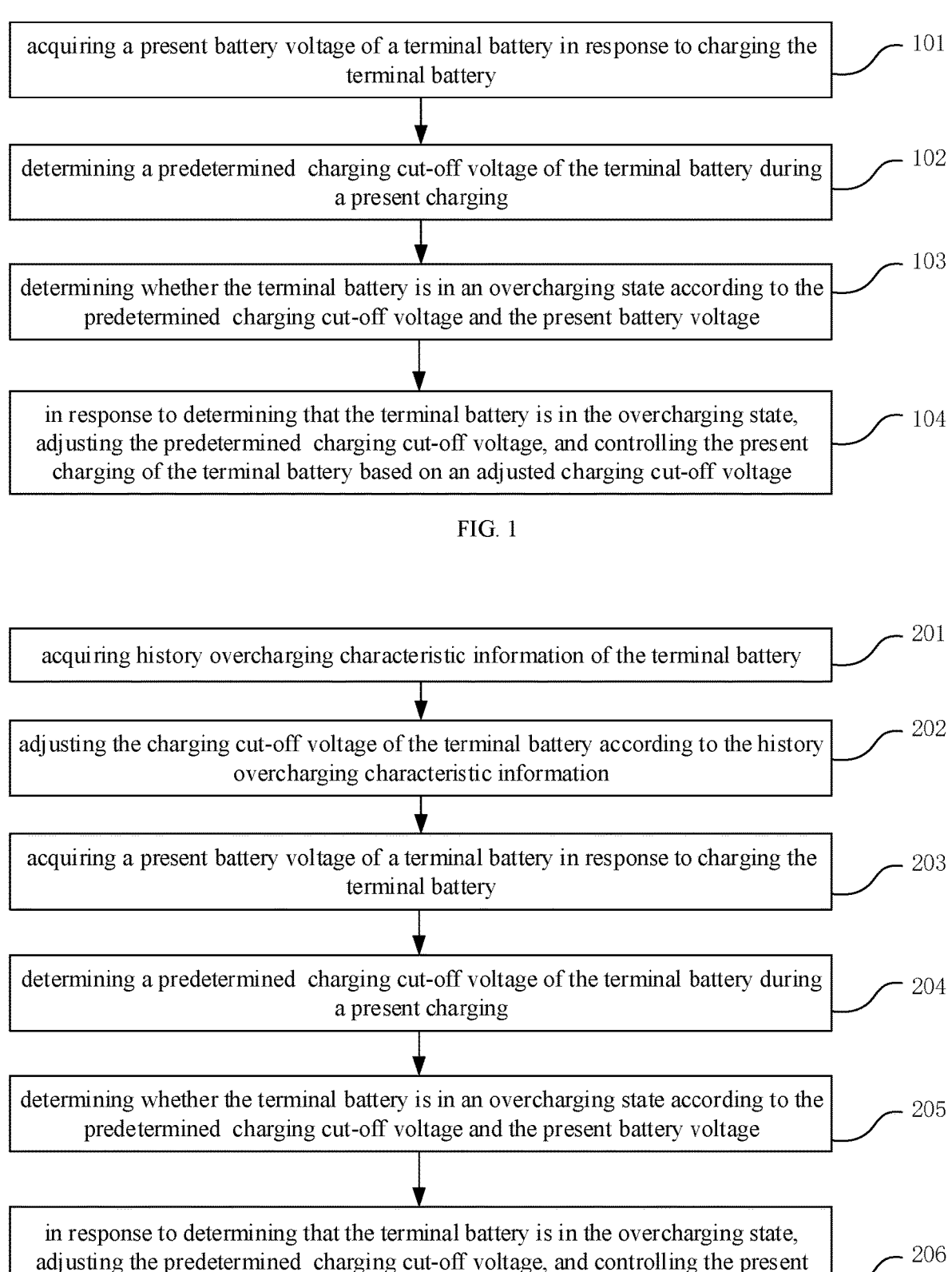

acquiring a present battery voltage of a terminal battery in response to charging the terminal battery ⟋ 101 determining a predetermined charging cut-off voltage of the terminal battery during a present charging ⟋ 102 determining whether the terminal battery is in an overcharging state according to the predetermined charging cut-off voltage and the present battery voltage ⟋ 103 in response to determining that the terminal battery is in the overcharging state, adjusting the predetermined charging cut-off voltage, and controlling the present charging of the terminal battery based on an adjusted charging cut-off voltage ⟋ 104

FIG. 1 acquiring history overcharging characteristic information of the terminal battery ⟋ 201 adjusting the charging cut-off voltage of the terminal battery according to the history overcharging characteristic information ⟋ 202 acquiring a present battery voltage of a terminal battery in response to charging the terminal battery ⟋ 203 determining a predetermined charging cut-off voltage of the terminal battery during a present charging ⟋ 204 determining whether the terminal battery is in an overcharging state according to the predetermined charging cut-off voltage and the present battery voltage ⟋ 205 in response to determining that the terminal battery is in the overcharging state, adjusting the predetermined charging cut-off voltage, and controlling the present charging of the terminal battery based on an adjusted charging cut-off voltage ⟋ 206

FIG. 2

METHOD OF CHARGING PROCESSING, ELECTRONIC DEVICE AND STORAGE MEDIUM

CROSS REFERENCE TO RELATED APPLICATION

This application claims the benefit of priority to Chinese patent application No. 202210963164.9, filed on Aug. 11, 2022, the contents of which are incorporated herein by reference in their entireties.

TECHNICAL FIELD

The present disclosure relates to a field of battery technologies, and in particular to, a method of charging a battery, an electronic device and a storage medium.

BACKGROUND

Lithium-ion batteries have been widely applied in electronic products due to advantages of large capacity, high voltage, small size, long life, for example. With continuous use of the lithium-ion batteries, a life of the lithium-ion batteries inevitably tends to decline i.e., a battery capacity becomes smaller and smaller. Newly delivered lithium-ion batteries can often have a cycle life measured in factory reaching 800-1000 charge-discharge cycles, and a battery capacity retention rate more than 80%, which means that users can feel that there is no significant reduction in battery capacity when using lithium-ion battery products for more than 2-3 years. However, during actual use of the lithium-ion battery products, many users have obviously felt the decline of battery capacity within one year or even less after using the lithium-ion battery products, which is closely related to actual abuse behaviors of batteries by users.

Overcharging is one of the most common abuse behaviors. Take mobile phones for example, many users charge the mobile phones before going to bed at night, and then the mobile phones may be powered off when the users get up the next day. Also, some mobile phone users have a condition of "Low Battery Anxiety". These users will be nervous and anxious when the battery level of the mobile phones is lower than a certain "safe value". Even if the battery level of the mobile phones is high without requirements of charging, the users will also charge the batteries of the mobile phones to full level. Such overcharging behaviors will cause great damage to the lithium-ion batteries and seriously affect a battery life.

SUMMARY

According to a first aspect of embodiments of the disclosure, there is provided a method of charging processing. The method includes:

acquiring a present battery voltage of a terminal battery in response to charging the terminal battery;

determining a predetermined charging cut-off voltage of the terminal battery during a present charging;

determining whether the terminal battery is in an overcharging state according to the predetermined charging cut-off voltage and the present battery voltage; and in response to determining that the terminal battery is in the overcharging state, adjusting the predetermined charging cut-off voltage, and controlling the present charging of the terminal battery based on an adjusted charging cut-off voltage.

According to a second aspect of embodiments of the disclosure, there is provided an electronic device. The electronic device includes a battery and a processor. The processor is configured to:

acquire a present battery voltage of a terminal battery in response to charging the terminal battery;

determine a predetermined charging cut-off voltage of the terminal battery during a present charging;

determine whether the terminal battery is in an overcharging state according to the predetermined charging cut-off voltage and the present battery voltage; and in response to determining that the terminal battery is in the overcharging state, adjust the predetermined charging cut-off voltage, and control the present charging of the terminal battery based on an adjusted charging cut-off voltage.

According to a third aspect of embodiments of the disclosure, there is provided a computer-readable storage medium, when instructions stored on the storage medium are executed by a processor an electronic device, causing the electronic device capable of implementing:

acquiring a present battery voltage of a terminal battery in response to charging the terminal battery;

determining a predetermined charging cut-off voltage of the terminal battery during a present charging;

determining whether the terminal battery is in an overcharging state according to the predetermined charging cut-off voltage and the present battery voltage; and in response to determining that the terminal battery is in the overcharging state, adjusting the predetermined charging cut-off voltage, and controlling the present charging of the terminal battery based on an adjusted charging cut-off voltage.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a portion of the specification and illustrate embodiments in accordance with the disclosure, and the drawings together with the specification are used to explain the principle of the disclosure.

FIG. 1 is a flowchart illustrating a method of charging processing according to an embodiment of the present disclosure.

FIG. 2 is a flowchart illustrating a method of charging processing according to another embodiment of the present disclosure.

DETAILED DESCRIPTION

Figure 3:
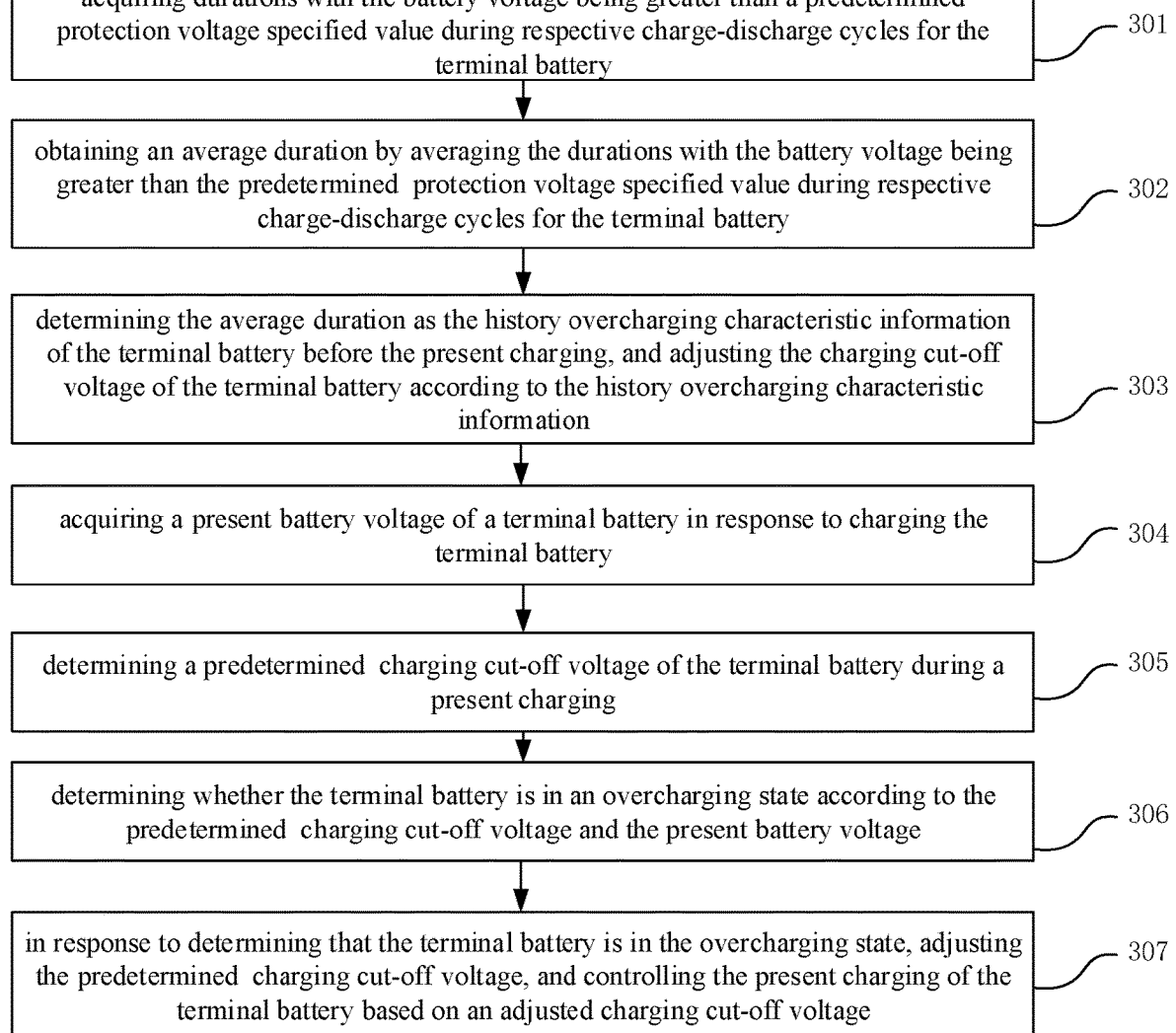
FIG. 3 is a flowchart illustrating a method of charging processing according to yet another embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the technical solution of this disclosure, acquisition, storage, use, processing, transmission, provision and publication of the involved user personal information all comply with the provisions of relevant laws, and do not violate public order and good customs.

The present disclosure provides a method and an apparatus of charging processing, an electronic device and a storage medium, which may flexibly adjust a charging cut-off voltage of a terminal battery according to a charging state of the terminal battery during each charging to protect the terminal battery. FIG. 1 is a flowchart illustrating a method of charging processing according to an embodiment of the present disclosure. As illustrated in FIG. 1, the method may include the following blocks.

At block 101, a present battery voltage of a terminal battery is acquired in response to charging the terminal battery.

It is noted that the present battery voltage of the terminal battery may be a battery voltage when charging the terminal battery starts.

At block 102, a predetermined charging cut-off voltage of the terminal battery during a present charging is determined.

It is noted that the predetermined charging cut-off voltage of the terminal battery during the present charging may be a charging cut-off voltage specified value provided in a specification of the terminal battery. Alternatively, a charging cut-off voltage of the terminal battery may be adjusted before the present charging according to personal use condition of a user, and a target charging cut-off voltage obtained after adjusting is determined as the predetermined charging cut-off voltage of the terminal battery during the present charging. For example, when the user frequently has an overcharge behavior, the charging cut-off voltage may be appropriately reduced based on the charging cut-off voltage specified value, and the charging cut-off voltage having adjusted is configured as the predetermined charging cut-off voltage of the terminal battery during the present charging, thus protecting the terminal battery and extending a battery life.

At block 103, it is determined whether the terminal battery is in an overcharging state according to the predetermined charging cut-off voltage and the present battery voltage.

In some embodiments of the present disclosure, the present battery voltage may be compared with the predetermined charging cut-off voltage, and whether the terminal battery is in the overcharging state may be determined according to a comparison result. As a possible implementation, a difference between the predetermined charging cut-off voltage and the present battery voltage may be calculated, and it may be determined that the terminal battery is in the overcharging state in response to determining that the difference between the predetermined charging cut-off voltage and the present battery voltage is less than or equal to a predetermined difference. For example, the predetermined difference may be set as 50 mV.

At block 104, in response to determining that the terminal battery is in the overcharging state, the predetermined charging cut-off voltage is adjusted, and the present charging of the terminal battery is controlled based on an adjusted charging cut-off voltage.

In some embodiments of the present disclosure, in response to determining that the terminal battery is in the overcharged state, the predetermined charging cut-off voltage of the terminal battery during the present charging may be appropriately reduced according to actual overcharged state, which is not limited in the present disclosure. As an example, the charging cut-off voltage of the terminal battery during the present charging is reduced from the predetermined charging cut-off voltage to a first charging cut-off voltage, and the process of the present charging of the terminal battery may be managed and controlled based on the first charging cut-off voltage. The first charging cut-off voltage is greater than or equal to the present battery voltage and less than or equal to the predetermined charging cut-off voltage. It may be noted that the first charging cut-off voltage is decided by the present battery voltage, the larger the present battery voltage is, and the smaller the first charging cut-off voltage is.

In some embodiments of the present disclosure, the predetermined charging cut-off voltage of the terminal battery during the present charging may not be adjusted in response to determining that the terminal battery is not in the overcharge state, which may avoid affecting the user experience.

According to the method of charging processing of embodiments of the present disclosure, it is determined whether the terminal battery is presently in the overcharging state according to the present battery voltage of the terminal battery when charging the terminal battery starts and the predetermined charging cut-off voltage during the present charging. The present charging cut-off voltage during the present charging may be adjusted in response to determining that the terminal battery is in the overcharging state. Therefore, the disclosure may flexibly adjust the charging cut-off voltage of the terminal battery according to a charging state of the terminal battery during each charging, to protect the terminal battery and extend the battery life.

It is noted that due to different charging habits of different users, in addition to considering the charging state of the terminal battery during the present charging, the predetermined charging cut-off voltage of the terminal battery during the present charging may also be adjusted according to history of overcharging characteristic information for the user. FIG. 2 is a flowchart illustrating a method of charging processing according to another embodiment of the present disclosure. As illustrated in FIG. 2, the method may include the following blocks.

At block 201, history overcharging characteristic information of the terminal battery is acquired.

For example, the history overcharging characteristic information may include an average duration of the battery voltage being greater than a predetermined protection voltage during respective charge-discharge cycles for the terminal battery before the present charging, or may be a ratio between a number of times of the terminal battery being in the overcharge state during respective charge-discharge cycles before the present charging and a total number of the charge-discharge cycles. The actual charging behavior of the terminal battery before the present charging may be analyzed, according to the history overcharging characteristic information, to determine whether the terminal battery is frequently overcharged, or the terminal battery lasts for too long in a high voltage state, thus further determining whether the terminal battery is at risk of aging and failure.

At block 202, the charging cut-off voltage of the terminal battery is adjusted according to the history overcharging characteristic information.

As a possible implementation, in response to determining that the ratio between the number of times of the terminal battery being in the overcharge state and the total number of the charge-discharge cycles is greater than a predetermined ratio threshold, or the average duration of the battery voltage being greater than the predetermined protection voltage during respective charge-discharge cycles is greater than a predetermined time threshold, the charging cut-off voltage may be adjusted, to appropriately reduce the charging cut-off voltage of the terminal battery during the present charging based on the charging cut-off voltage specified value, so as to obtain the target charging cut-off voltage. In response to determining that the ratio between the number of times of the terminal battery being in the overcharge state and the total number of the charge-discharge cycles is less than or equal to the predetermined ratio threshold, and the average duration of the battery voltage being greater than the predetermined protection voltage during respective charge-discharge cycles is less than or equal to the predetermined time threshold, the charging cut-off voltage of the terminal battery during the process of the present charging may not be adjusted, and the charging cut-off voltage specified value may be as the target charging cut-off voltage.

At block 203, a present battery voltage of a terminal battery is acquired in response to charging the terminal battery.

At block 204, the target charging cut-off voltage is determined as the predetermined charging cut-off voltage of the terminal battery during the present charging.

At block 205, it is determined whether the terminal battery is in an overcharging state according to the predetermined charging cut-off voltage and the present battery voltage.

At block 206, in response to determining that the terminal battery is in the overcharging state, the predetermined charging cut-off voltage is adjusted, and the present charging of the terminal battery is controlled based on an adjusted charging cut-off voltage.

It should be noted that in embodiments of the present disclosure, the blocks 203 to 206 may be implemented in any of embodiments of the present disclosure, which will not be limited in the disclosure, nor will repeat in the disclosure.

According to the method of charging processing of embodiments of the present disclosure, the actual charging behavior of the terminal battery before the present charging may be analyzed, according to the history overcharging characteristic information, to determine charging habits of the user of the terminal battery, such as whether the terminal battery is frequently overcharged, and to further determine whether the terminal battery is at risk of aging and failure. In response to determining that the terminal battery is at risk of aging and failure, the predetermined charging cut-off voltage of the terminal battery during the present charging is appropriately adjusted. It is determined whether the terminal battery is presently in the overcharging state according to the present battery voltage of the terminal battery when charging the terminal battery starts and the predetermined charging cut-off voltage during the present charging. The charging cut-off voltage of the present charging may be adjusted in response to determining that the terminal battery is in the overcharging state. Therefore, the disclosure may more flexibly adjust the charging cut-off voltage of the terminal battery combining personal use habits of the user and the state of the present charging, to further protect the terminal battery and extend the battery life.

In order to more accurately capture the history overcharging characteristic information and accurately reflect charging habits of different users, a protection voltage specified value of the terminal battery may be pre-calculated, and an average duration of the battery voltage being greater than a predetermined protection voltage specified value during charging-discharging cycles for the terminal battery before the present charging may be determined as the history overcharging characteristic information of the terminal battery before the present charging. FIG. 3 is a flowchart illustrating a method of charging processing according to yet another embodiment of the present disclosure. As illustrated in FIG. 3, the method may include the following blocks.

At block 301, durations with the battery voltage being greater than a predetermined protection voltage specified value during respective charge-discharge cycles for the terminal battery are acquired.

For example, the predetermined protection voltage specified value may be obtained through cycle test in advance. As an example, terminal batteries having a same model as a terminal battery to be charged may be floating charged in advance to determine a charging cut-off voltage specified value of the terminal batteries, and the charging cut-off voltage specified value is determined as a first floating charge test voltage $U_1$. A second floating charge test voltage $U_2$, a third floating charge test voltage $U_3$, . . . , an nth floating charge test voltage $U_n$ are determined based on the first floating charge test voltage $U_1$, where $U_1 > U_2 > U_3 > \ldots > U_n$, n is a positive integer. The n terminal batteries are respectively charged to the first floating charge test voltage $U_1$, the second floating charge test voltage $U_2$, the third floating charge test voltage $U_3$, . . . , the nth floating charge test voltage $U_n$, and standard discharging is performed on the n terminal batteries respectively after constant voltage charging lasts for x hours, where $1 < x \leq 12$. As an example, x may be 3. The foregoing charge-discharge cycle may be repeated for 800 times, and the life of each terminal battery may be recorded after 800 cycles.

Meanwhile, charge-discharge cycle test is performed on terminal batteries without floating charge link. The terminal batteries may be respectively charged to the first floating charge test voltage $U_1$, the second floating charge test voltage $U_2$, the third floating charge test voltage $U_3$, . . . , the nth floating charge test voltage $U_n$, and then the standard discharging may be performed on the n terminal batteries respectively. The foregoing charge-discharge cycle may be repeated for 800 times, and the life of each terminal battery may be recorded after 800 cycles.

Comparing a life of a terminal battery after the floating charge step and a life of a terminal battery without the floating charge step charged to the same voltage, it may determine a maximum floating charge test voltage under the life of the terminal battery having the floating charge step being same as the life of the terminal battery without the floating charge step. That is, when the charging cut-off voltage of the terminal battery is less than or equal to the maximum floating charge test voltage, the life of the terminal battery with x hours of floating charge and 800 cycles of charging and discharging steps has not deteriorated compared with an optimal life of the terminal battery without floating charge and 800 cycles of charging and discharging steps. Therefore, the maximum floating charge test voltage is determined as the protection voltage specified value Urn.

Based on the protection voltage specified value, durations with the battery voltage being greater than the predetermined protection voltage specified value during respective charge-discharge cycles for the terminal battery before the present charging are acquired.

At block 302, an average duration is obtained by averaging the durations with the battery voltage being greater than the predetermined protection voltage specified value during respective charge-discharge cycles for the terminal battery; and At block 303, the average duration is determined as the history overcharging characteristic information of the terminal battery before the present charging, and a charging cut-off voltage of the terminal battery is adjusted according to the history charging characteristic information.

As a possible implementation, the average duration is compared with a predetermined floating charge duration, and the charging cut-off voltage of the terminal battery is adjusted in response to determining that the average duration is greater than the floating charge duration. In some embodiments of the present disclosure, a floating charge duration in the foregoing process of obtaining the protection voltage specified value through the cycle test may be taken as the predetermined floating charge duration x. A charging cut-off voltage specified value $U_0$ of the terminal battery is determined, and a target charging cut-off voltage $U_1$ is obtained according to the charging cut-off voltage specified value $U_0$, the protection voltage specified value $U_m$, the average duration y, and the predetermined floating charge duration x. The charging cut-off voltage of the terminal battery is reduced to the target charging cut-off voltage $U_i$. For example, the target charging cut-off voltage $U_1$ may be obtained by the following formula (1).

$$U_i=[(U_0-U_m)/(x-12)]\times(y-12)+U_m \qquad (1)$$

As another possible implementation, comparing the average duration with an upper limit of the predetermined floating charge duration, in response to determining that the average duration is greater than or equal to the upper limit of the predetermined floating charge duration, the protection voltage specified value $U_m$ is determined as a target charging cut-off voltage, and the charging cut-off voltage of the terminal battery is reduced to the target charging cut-off voltage. For example, the predetermined floating charge duration may be set as a value from 1 hour to 12 hours, and the upper limit of the predetermined floating charge duration may be 12 hours.

At block 304, a present battery voltage of a terminal battery is acquired in response to charging the terminal battery.

At block 305, a predetermined charging cut-off voltage of the terminal battery during a present charging is determined.

At block 306, it is determined whether the terminal battery is in an overcharging state according to the predetermined charging cut-off voltage and the present battery voltage.

At block 307, in response to determining that the terminal battery is in the overcharging state, the predetermined charging cut-off voltage is adjusted, and the present charging of the terminal battery is controlled based on an adjusted charging cut-off voltage.

It should be noted that in embodiments of the present disclosure, the blocks 304 to 307 may be implemented in any of embodiments of the present disclosure, which will not be limited in the disclosure, nor will repeat in the disclosure.

According to the method of charging processing of embodiments of the present disclosure, the average duration of the battery voltage being greater than the predetermined protection voltage specified value during the charging-discharging cycles for the terminal battery before the present charging may be determined as the history overcharging characteristic information of the terminal battery before the present charging, the charging habits of different users may be accurately reflected. The actual charging behavior of the terminal battery before the present charging may be analyzed, according to the history overcharging characteristic information, to determine the charging habits of the user of the terminal battery, such as whether the terminal battery is frequently overcharged, and to further determine whether the terminal battery is at risk of aging and failure. In response to determining that the terminal battery is at risk of aging and failure, the predetermined charging cut-off voltage of the terminal battery during the present charging is appropriately adjusted. It is determined whether the terminal battery is presently in the overcharging state according to the present battery voltage of the terminal battery when charging the terminal battery starts and the predetermined charging cut-off voltage of the present charging. The predetermined charging cut-off voltage of the present charging may be adjusted in response to determining that the terminal battery is in the overcharging state. Therefore, the disclosure may more flexibly adjust the charging cut-off voltage of the terminal battery combining personal use habits of the user and the state of the present charging, to further protect the terminal battery and extend the battery life.

Figure 4:
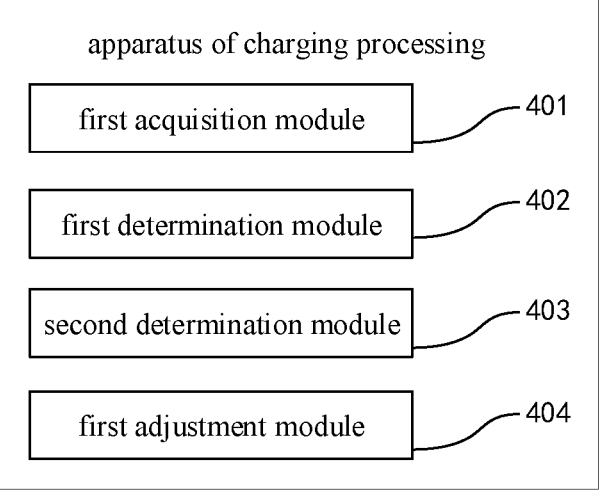
FIG. 4 is a schematic diagram illustrating modules of an apparatus of charging processing according to an embodiment of the present disclosure.

FIG. 4 is a schematic diagram illustrating modules of an apparatus of charging processing according to an embodiment of the present disclosure. As illustrated in FIG. 4, the apparatus may include a first acquisition module 401, a first determination module 402, a second determination module 403 and a first adjustment module 404.

The first acquisition module 401 is configured to acquire a present battery voltage of a terminal battery in response to charging the terminal battery.

The first determination module 402 is configured to determine a predetermined charging cut-off voltage of the terminal battery during a present charging.

The second determination module 403 is configured to determine whether the terminal battery is in an overcharging state according to the predetermined charging cut-off voltage and the present battery voltage.

The first adjustment module 404 is configured to, in response to determining that the terminal battery is in the overcharging state, adjust the predetermined charging cut-off voltage, and control the present charging of the terminal battery based on an adjusted charging cut-off voltage.

In some embodiments of the disclosure, the first determination module 402 is configured to: determine whether a charging cut-off voltage of the terminal battery has been adjusted before the present charging; and determine a target charging cut-off voltage obtained after adjusting as the predetermined charging cut-off voltage of the terminal battery during the present charging in response to determining that the charging cut-off voltage of the terminal battery has been adjusted before the present charging.

As for the above apparatus embodiment, the specific manner of each module to perform operations has been described in detail in method embodiments, and will not be described in detail here.

According to the apparatus of charging processing of embodiments of the present disclosure, it is determined whether the terminal battery is presently in the overcharging state according to the present battery voltage of the terminal battery when charging the terminal battery starts and the predetermined charging cut-off voltage of the present charging. The predetermined charging cut-off voltage of the present charging may be adjusted in response to determining that the terminal battery is in the overcharging state. Therefore, the disclosure may flexibly adjust the charging cut-off voltage of the terminal battery according to a charging state of the terminal battery during each charging, to protect the terminal battery and extend a battery life.

Figure 5:
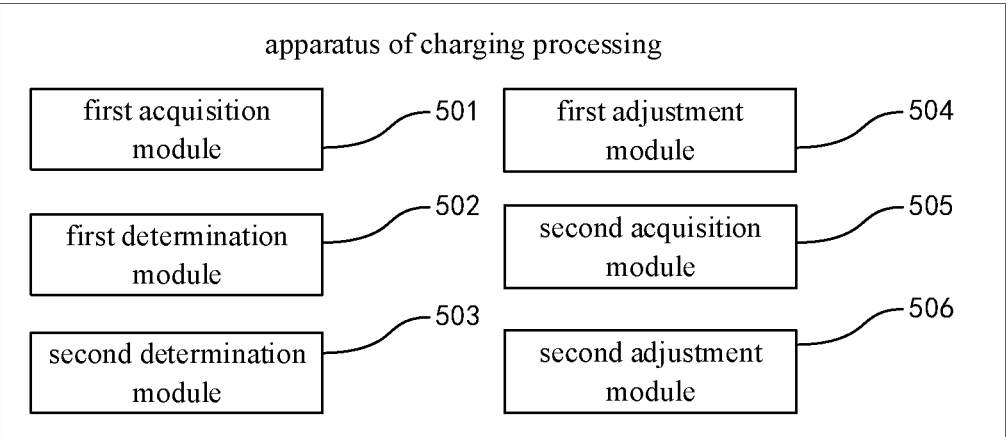
FIG. 5 is a schematic diagram illustrating modules of an apparatus of charging processing according to another embodiment of the present disclosure.

FIG. 5 is a schematic diagram illustrating modules of an apparatus of charging processing according to another embodiment of the present disclosure. On the basis of FIG. 4, as illustrated in FIG. 5, the apparatus may further include a second acquisition module 505 and a second adjustment module 506. Blocks 501-504 in FIG. 5 have a similar function and structure to blocks 401-404 in FIG. 4.

The second acquisition module 505 is configured to acquire history overcharging characteristic information of the terminal battery.

The second adjustment module 506 is configured to adjust the charging cut-off voltage of the terminal battery according to the history overcharging characteristic information.

In some embodiments of the disclosure, the second acquisition module 505 is configured to: acquire durations with the battery voltage being greater than a predetermined protection voltage specified value during respective charge-discharge cycles for the terminal battery; obtain an average duration by averaging the durations with the battery voltage being greater than the predetermined protection voltage specified value during respective charge-discharge cycles for the terminal battery; and determine the average duration as the history overcharging characteristic information of the terminal battery.

In some embodiments of the disclosure, the second adjustment module 506 is configured to: compare the average duration with a predetermined floating charge duration; adjust the charging cut-off voltage of the terminal battery in response to determining that the average duration is greater than the predetermined floating charge duration.

In some embodiments of the disclosure, the second adjustment module 506 is configured to: determine a charging cut-off voltage specified value of the terminal battery; obtain a target charging cut-off voltage according to the charging cut-off voltage specified value, the protection voltage specified value, the average duration, and the predetermined floating charge duration; and reduce the charging cut-off voltage of the terminal battery to the target charging cut-off voltage.

In some embodiments of the disclosure, the second adjustment module 506 is configured to in response to determining that the average duration is greater than or equal to an upper limit of the predetermined floating charge duration, determine the protection voltage specified value as a target charging cut-off voltage, and reduce the charging cut-off voltage of the terminal battery to the target charging cut-off voltage.

In some embodiments of the disclosure, the first determination module 502 is configured to determine a charging cut-off voltage specified value of the terminal battery as the predetermined charging cut-off voltage of the terminal battery during the present charging in response to determining that the charging cut-off voltage of the terminal battery has not been adjusted before the present charging.

In some embodiments of the disclosure, the second determination module 503 is configured to determine that the terminal battery is in the overcharging state in response to determining that a difference between the predetermined charging cut-off voltage and the present battery voltage is less than or equal to a predetermined difference.

In some embodiments of the disclosure, the first adjustment module 504 is configured to reduce the charging cut-off voltage of the terminal battery during the present charging from the predetermined charging cut-off voltage to a first charging cut-off voltage; in which, the first charging cut-off voltage is greater than or equal to the present battery voltage and less than or equal to the predetermined charging cut-off voltage.

In some embodiments of the disclosure, the first charging cut-off voltage is decided by the present battery voltage, the larger the present battery voltage is, and the smaller the first charging cut-off voltage is.

As for the above apparatus embodiment, the specific manner of each module to perform operations has been described in detail in method embodiments, and will not be described in detail here.

According to the apparatus of charging processing of embodiments of the present disclosure, the actual charging behavior of the terminal battery before the present charging may be analyzed, according to the history overcharging characteristic information, to determine charging habits of the user of the terminal battery, such as whether the terminal battery is frequently overcharged, and to further determine whether the terminal battery is at risk of aging and failure. In response to determining that the terminal battery is at risk of aging and failure, the predetermined charging cut-off voltage of the terminal battery during the present charging is appropriately adjusted. It is determined whether the terminal battery is presently in the overcharging state according to the present battery voltage of the terminal battery when charging the terminal battery starts and the predetermined charging cut-off voltage of the present charging. The predetermined charging cut-off voltage of the present charging may be adjusted in response to determining that the terminal battery is in the overcharging state. Therefore, the disclosure may more flexibly adjust the charging cut-off voltage of the terminal battery combining personal use habits of the user and the state of the present charging, to further protect the terminal battery and extend the battery life.

Figure 6:
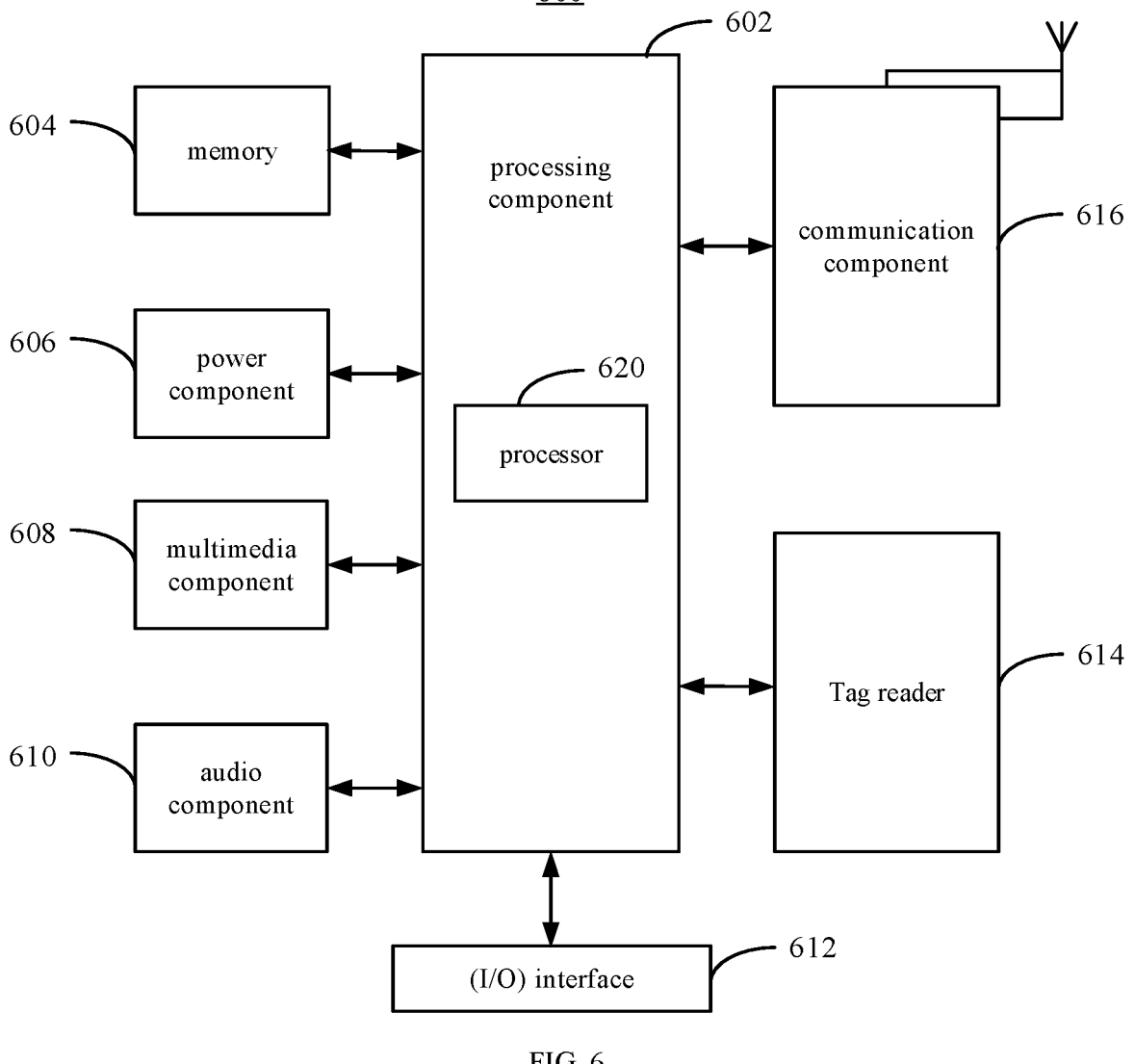
FIG. 6 is a block diagram illustrating an electronic device according to an embodiment of the present disclosure.

FIG. 6 is a block diagram illustrating an electronic device according to an embodiment of the present disclosure. For example, the electronic device 600 may be a mobile phone, a computer, a digital broadcasting terminal, a message transceiver device, a game console, a tablet device, a medical device, a fitness device and a personal digital assistant.

Referring to FIG. 6, the electronic device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 may include a front camera and/or a rear camera. When the electronic device is in an operation mode, such as a shooting mode or a video mode, the front camera or the rear camera may receive external multimedia data. Each front camera and rear camera may be a fixed optical lens system or with focal length and optical zoom capacity.

The audio component 610 is configured to output and/or input audio signals. For example, the audio component 610 includes a microphone (MIC) configured to receive an external audio signal when the device 600 is in an operation mode, such as a call mode, a recording mode, and a speech recognition mode. The microphone is configured to receive external audio signals. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a power-on button, and a lock button.

The sensor component 614 includes one or more sensors, configured to provide various aspects of status assessment for the electronic device. For example, the sensor component 614 may detect the on/off state of the electronic device and the relative positioning of the component. For example, the component is a display and a keypad of the electronic device. The sensor component 614 may further detect the location change of the electronic device or one component of the electronic device, the presence or absence of contact between the user and the device, the orientation or acceleration/deceleration of the device, and the temperature change of the device. The sensor component 614 may include a proximity sensor, which is configured to detect the existence of the objects nearby without any physical contact. The sensor component 614 may further include a light sensor such as CMOS or CCD image sensor, which is configured to use in imaging applications. In some embodiments, the sensor component 614 may further include an acceleration transducer, a gyroscope sensor, a magnetic sensor, a pressure sensor or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method of charging processing, comprising:
   acquiring a present battery voltage of a terminal battery in response to charging the terminal battery;
   determining a predetermined charging cut-off voltage of the terminal battery during a present charging;
   determining whether the terminal battery is in an overcharging state according to the predetermined charging cut-off voltage and the present battery voltage;
   in response to determining that the terminal battery is in the overcharging state, adjusting the predetermined charging cut-off voltage, and controlling the present charging of the terminal battery based on an adjusted charging cut-off voltage;

acquiring history overcharging characteristic information of the terminal battery; and adjusting the charging cut-off voltage of the terminal battery according to the history overcharging characteristic information, to obtain the predetermined charging cut-off voltage of the terminal battery during the present charging;

wherein acquiring the history overcharging characteristic information of the terminal battery comprises:

acquiring durations with a battery voltage being greater than a protection voltage specified value during respective charge-discharge cycles for the terminal battery;

obtaining an average duration by averaging the durations with the battery voltage being greater than the protection voltage specified value during respective charge-discharge cycles for the terminal battery; and determining the average duration as the history overcharging characteristic information of the terminal battery.

2. The method according to claim 1, wherein determining the predetermined charging cut-off voltage of the terminal battery during the present charging comprises:

determining whether a charging cut-off voltage of the terminal battery has been adjusted before the present charging; and determining a target charging cut-off voltage obtained after adjusting as the predetermined charging cut-off voltage of the terminal battery during the present charging in response to determining that the charging cut-off voltage of the terminal battery has been adjusted before the present charging.

3. The method according to claim 2, wherein determining the predetermined charging cut-off voltage of the terminal battery during the present charging further comprises:

determining a charging cut-off voltage specified value of the terminal battery as the predetermined charging cut-off voltage of the terminal battery during the present charging in response to determining that the charging cut-off voltage of the terminal battery has not been adjusted before the present charging.

4. The method according to claim 1, wherein adjusting the charging cut-off voltage of the terminal battery according to the history overcharging characteristic information comprises:

comparing the average duration with a predetermined floating charge duration;

adjusting the charging cut-off voltage of the terminal battery in response to determining that the average duration is greater than the predetermined floating charge duration.

5. The method according to claim 4, wherein adjusting the charging cut-off voltage of the terminal battery comprises:

determining a charging cut-off voltage specified value of the terminal battery;

obtaining a target charging cut-off voltage according to the charging cut-off voltage specified value, the protection voltage specified value, the average duration, and the predetermined floating charge duration; and reducing the charging cut-off voltage of the terminal battery to the target charging cut-off voltage, and taking the target charging cut-off voltage as the predetermined charging cut-off voltage of the terminal battery during a present charging.

6. The method according to claim 1, wherein adjusting the charging cut-off voltage of the terminal battery according to the history overcharging characteristic information further comprises:

in response to determining that the average duration is greater than or equal to an upper limit of a predetermined floating charge duration, determining the protection voltage specified value as a target charging cut-off voltage, reducing the charging cut-off voltage of the terminal battery to the target charging cut-off voltage, and taking the target charging cut-off voltage as the predetermined charging cut-off voltage of the terminal battery during a present charging.

7. The method according to claim 1, wherein determining whether the terminal battery is in the overcharging state according to the predetermined charging cut-off voltage and the present battery voltage comprises:

determining that the terminal battery is in the overcharging state in response to determining that a difference between the predetermined charging cut-off voltage and the present battery voltage is less than or equal to a predetermined difference.

8. The method according to claim 1, wherein adjusting the predetermined charging cut-off voltage comprises:

reducing the charging cut-off voltage of the terminal battery during the present charging from the predetermined charging cut-off voltage to a first charging cut-off voltage;

wherein, the first charging cut-off voltage is greater than or equal to the present battery voltage and less than or equal to the predetermined charging cut-off voltage.

9. The method according to claim 8, wherein the first charging cut-off voltage is decided by the present battery voltage, the larger the present battery voltage is, and the smaller the first charging cut-off voltage is.

10. An electronic device, comprising:

a battery;

a processor;

wherein the processor is configured to:

acquire a present battery voltage of a terminal battery in response to charging the terminal battery;

determine a predetermined charging cut-off voltage of the terminal battery during a present charging;

determine whether the terminal battery is in an overcharging state according to the predetermined charging cut-off voltage and the present battery voltage;

in response to determining that the terminal battery is in the overcharging state, adjust the predetermined charging cut-off voltage, and control the present charging of the terminal battery based on an adjusted charging cut-off voltage;

acquire history overcharging characteristic information of the terminal battery; and adjust the charging cut-off voltage of the terminal battery according to the history overcharging characteristic information, to obtain the predetermined charging cut-off voltage of the terminal battery during the present charging;

wherein the processor is configured to acquire the history overcharging characteristic information of the terminal battery by:

acquiring durations with a battery voltage being greater than a protection voltage specified value during respective charge-discharge cycles for the terminal battery;

obtaining an average duration by averaging the durations with the battery voltage being greater than the protection voltage specified value during respective charge-discharge cycles for the terminal battery; and determining the average duration as the history overcharging characteristic information of the terminal battery.

11. The electronic device according to claim 10, wherein the processor is configured to:

determine whether a charging cut-off voltage of the terminal battery has been adjusted before the present charging; and determine a target charging cut-off voltage obtained after adjusting as the predetermined charging cut-off voltage of the terminal battery during the present charging in response to determining that the charging cut-off voltage of the terminal battery has been adjusted before the present charging.

12. The electronic device according to claim 11, wherein the processor is configured to:

determine a charging cut-off voltage specified value of the terminal battery as the predetermined charging cut-off voltage of the terminal battery during the present charging in response to determining that the charging cut-off voltage of the terminal battery has not been adjusted before the present charging.

13. The electronic device according to claim 10, wherein the processor is configured to:

compare the average duration with a predetermined floating charge duration;

adjust the charging cut-off voltage of the terminal battery in response to determining that the average duration is greater than the predetermined floating charge duration.

14. The electronic device according to claim 13, wherein the processor is configured to:

determine a charging cut-off voltage specified value of the terminal battery;

obtain a target charging cut-off voltage according to the charging cut-off voltage specified value, the protection voltage specified value, the average duration, and the predetermined floating charge duration; and reduce the charging cut-off voltage of the terminal battery to the target charging cut-off voltage, and taking the target charging cut-off voltage as the predetermined charging cut-off voltage of the terminal battery during a present charging.

15. The electronic device according to claim 10, wherein the processor is configured to:

in response to determining that the average duration is greater than or equal to an upper limit of a predetermined floating charge duration, determine the protection voltage specified value as a target charging cut-off voltage, reduce the charging cut-off voltage of the terminal battery to the target charging cut-off voltage, and taking the target charging cut-off voltage as the predetermined charging cut-off voltage of the terminal battery during a present charging.

16. A non-transitory computer-readable storage medium, when instructions stored on the storage medium are executed by a processor of an electronic device, causing the electronic device capable of implementing:

acquiring a present battery voltage of a terminal battery in response to charging the terminal battery;

determining a predetermined charging cut-off voltage of the terminal battery during a present charging;

determining whether the terminal battery is in an overcharging state according to the predetermined charging cut-off voltage and the present battery voltage;

in response to determining that the terminal battery is in the overcharging state, adjusting the predetermined charging cut-off voltage, and controlling the present charging of the terminal battery based on an adjusted charging cut-off voltage;

acquiring history overcharging characteristic information of the terminal battery; and adjusting the charging cut-off voltage of the terminal battery according to the history overcharging characteristic information, to obtain the predetermined charging cut-off voltage of the terminal battery during the present charging;

wherein acquiring the history overcharging characteristic information of the terminal battery comprises:

acquiring durations with a battery voltage being greater than a protection voltage specified value during respective charge-discharge cycles for the terminal battery;

obtaining an average duration by averaging the durations with the battery voltage being greater than the protection voltage specified value during respective charge-discharge cycles for the terminal battery; and determining the average duration as the history overcharging characteristic information of the terminal battery.

* * * * *